United States Patent [19]

Usie

[11] 3,865,261

[45] Feb. 11, 1975

[54] CANE PLANTER RAKE PLATE

[76] Inventor: Raynold Usie, P.O. Box 871, Houma, La. 70360

[22] Filed: Apr. 20, 1973

[21] Appl. No.: 352,951

[52] U.S. Cl................ 214/83.26, 198/131, 198/174
[51] Int. Cl............................................. B60p 1/00
[58] Field of Search........... 198/174, 172, 129, 178, 198/131; 294/52; 214/83.26, 83.36

[56] References Cited
UNITED STATES PATENTS

| 265,376 | 10/1882 | Bottomleu | 198/174 |
| 938,001 | 10/1909 | Kropp | 294/52 |
| 2,796,011 | 6/1957 | Schmidt | 294/52 |
| 3,286,858 | 11/1966 | Julien | 214/83.26 |

Primary Examiner—Richard A. Schacher
Assistant Examiner—Jeffrey V. Nase
Attorney, Agent, or Firm—Wilkinson, Mawhinney & Theibault

[57] ABSTRACT

The present disclosure is directed to a planter rake plate which is of single unitary construction having a base attachable to an endless chain and a free end having V-shaped notches for engaging opposite sides of a seed cane stalk for engaging same and moving the stalk along its axis for planting and which will permit the stalk to fall earthwardly due to gravity without tripping or actuating any stalk grasping fingers.

1 Claim, 3 Drawing Figures 3,865,261

CANE PLANTER RAKE PLATE

The closest prior art known to date is the L. J. Julien U.S. Pat. No. 3,286,858 entitled CANE PLANTER and the present invention is directed to elimination of the spring loaded cam actuated cane grasping fingers mounted on the flexible endless carrier which engage the cane stalks from the cane wagon and carry same rearwardly, the fingers being cammed open to drop the cane stalk for planting.

An object of the present invention is directed to replacement of the Julien fingers with rake plates. Instead of grasping the cane stalks with the fingers the present concept is directed to dragging the cane out of the wagon which action permits of a more uniform flow of seed cane to be planted.

A further object of the present invention is to provide a single unitary plate with no moving parts to eliminate the great amount of down time resulting from breakage of the spring loaded cam actuated fingers.

A still further object of the invention is the provision of a rigid single instrumentality for moving cane stalks from the cart to the plant position which eliminates spring or finger replacements and at the same time results in less damage to stalk eyes. The rake plate of the present invention does not employ spring biased grasping means which impale or otherwise injure the cane stalk but which merely acts as a wedge which drops the stalk by gravity pull alone not requiring camming action to open spring loaded jaws before gravity pull will disengage the seed stalks from the planter.

With the foregoing and other objects in view the invention will be more fully described hereinafter and more particularly pointed out in the appended claims.

In the drawings in which like parts are denoted by reference characters throughout the several views.

Figure 1:
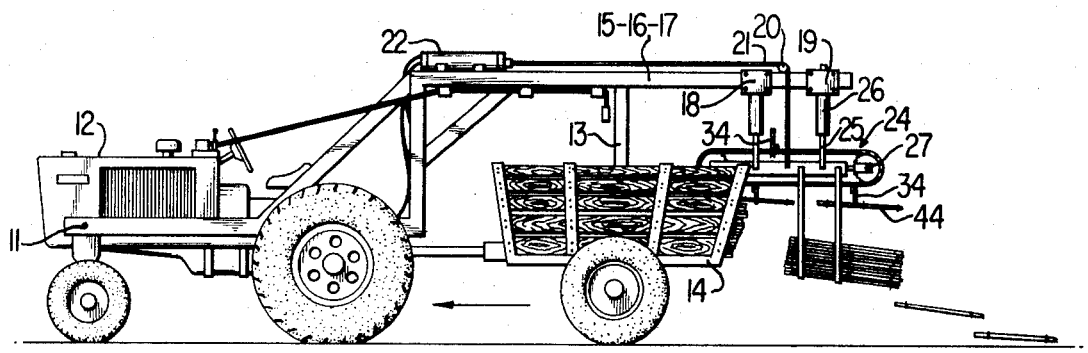
FIG. 1 is a side elevational view of a tractor drawn seed cane planter having the rake plates of the present invention installed thereon.
Figure 2:
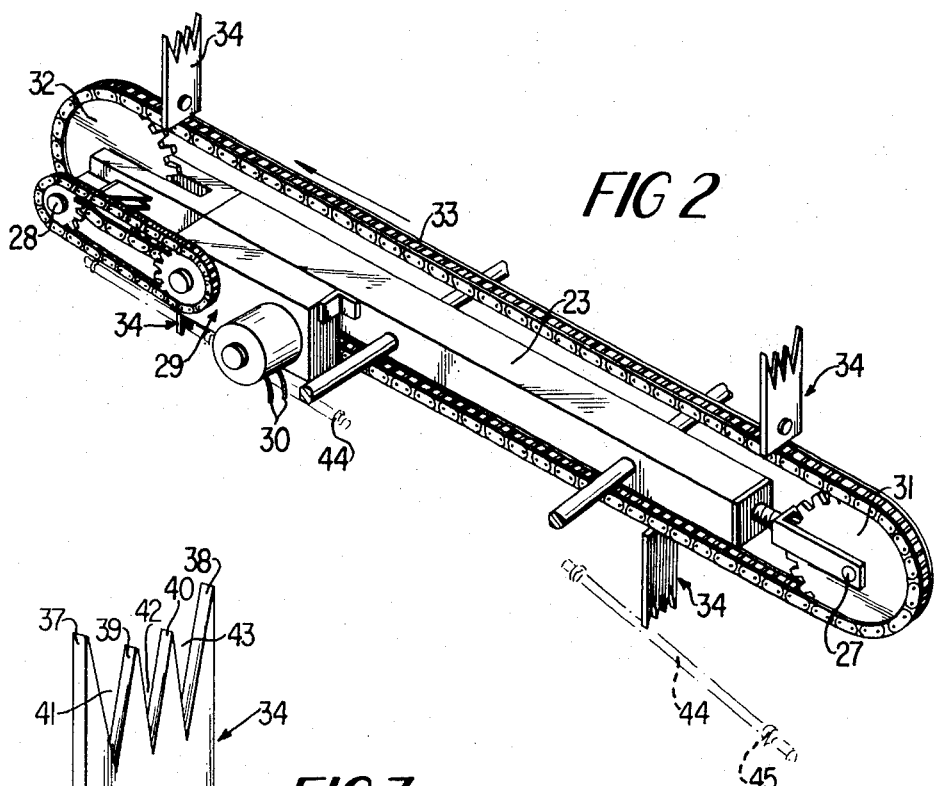
FIG. 2 is a perspective view of one of the conveyors having the planter rake plate of the present invention installed thereon.

Referring now to FIGS. 1 and 2 a planter frame 10 is pivotally connected at 11 to a tractor 12. The frame is also supported by bars 13 fixed to the cane cart 14. The frame comprises three longitudinal beams 15, 16 and 17. Each of the side beams 15, 16 are directly connected to one of the bars 13, and all three are connected together by cross-beams 18, 19. The center beam 17 carries a pulley 20 over which passes a cable 21. The cable 21 is attached at one end to power means which may be a hydraulic cylinder 22 controlled from the tractor and at the other end to a sub-frame 23 which carries the three conveyor chains 24. Upright guide rods 25 fixed to the sub-frame slide telescopically in tubes 26 fixed to the main frame 10, so that the sub-frame is kept level as it is moved up and down by the cable 21.

Referring now to FIG. 2, the sub-frame carries proximate one end the stationary shaft 27 and proximate the other end the driven shaft 28. The driven shaft 28 is powered by a hydraulic turbine drive unit 29 mounted on the sub-frame and supplied through hoses 30 from the tractor hydraulic system. Each of the shafts 27, 28 carries three sprocket wheels. The sprocket wheels 31 on the stationary shaft 27 are idlers while those 32 on the driven shaft 28 turn with the shaft on which they are carried. A chain 33 is stretched between each idler and the associated driven sprocket wheel, and each chain carries a plurality of rake plates 34.

Figure 3:
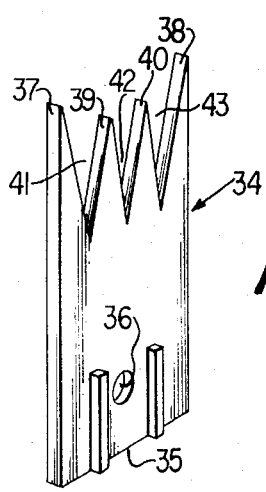
FIG. 3 is a perspective view at an enlarged scale of the planter rake plate in accordance with the present invention.

Referring now to FIG. 3, the rake plates 34, have a base 35 through which passes an attaching opening 36 for securing the rake plate 34 to the chain 33. At each side of the plate at its free end are two teeth 37 and 38 while lying between same are two smaller teeth 39 and 40. V-notches 41, 42 and 43 define wedges into which are received cane stalks 44. The plate 34 engages the cane stalk immediately behind the eye 45 to slide the stalks 44 rearwardly of the cane cart 14 as shown in FIG. 1 where the stalk 44 falls freely by gravity as shown in the lower right hand end of FIG. 2.

The rake plate 34 being of rugged unitary construction having no moving parts results in no down time to replace springs or fingers as taught in the prior art and therefore is a valuable contribution to the sugar cane planting art.

The planter rake plates 34 on the individual conveyor chains are spaced apart a distance of about 8 feet, slightly longer than the length of a stalk of cane, so that no stalk will be engaged by two rakes at the same time. The rake plates 34 on each conveyor chain are spaced from those on the other chains, longitudinally of the vehicle, so that the three conveyors operate to feed stalks successively or in continuous overlap rather than simultaneously.

What is claimed is:

1. A sugar cane planter having a propelled vehicular frame for carrying a plurality of horizontally disposed sugar cane seed stalks for deposit horizontally rearwardly of the vehicle frame upon the ground, a planter comprising an endless conveyor positioned above said horizontally disposed cane stalks, a plurality of planter rake plates secured to the endless conveyor with the major length of the plates directed toward the cane stalks, and a plurality of wedge-like cane stalk engaging means having a plurality of V-notches transversely of the free end of the plate, positioned to grasp a cane stalk proximate its eye for moving the stalk rearwardly of the vehicle for deposit by free fall from said wedge-like engaging means from the conveyor to the ground.

* * * * *